May 27, 1952   G. J. KIRCHNER ET AL   2,598,181
FLEXIBLE CONNECTION
Original Filed Sept. 23, 1943

INVENTORS
HARRY OTTINGER and
GEORGE J. KIRCHNER,
by John E. Jackson
their Attorney.

Patented May 27, 1952

2,598,181

UNITED STATES PATENT OFFICE 2,598,181

FLEXIBLE CONNECTION

George J. Kirchner, Lorain, Ohio, and Harry Ottinger, McKeesport, Pa., assignors to United States Steel Company, a corporation of New Jersey Continuation of application Serial No. 503,548, September 23, 1943. This application September 5, 1947, Serial No. 772,372

4 Claims. (Cl. 80—13)

This invention relates to flexible connections or couplings, and more particularly to an improved flexible coupling for the mandrel bar and the thrust spindle of seamless tube mills and the like, this application being a continuation of our prior application, Serial No. 503,548, filed September 23, 1943 and now abandoned.

In the manufacture of seamless tubes or pipes, it is the general practice to impart a helical motion to the workpiece by means of rolls rotating it on its axis, and at the same time, advancing it over a mandrel. The forward or outer end of the mandrel carries a piercing point or plug and the inner end thereof is connected to a thrust spindle which permits the mandrel to rotate with the advancing workpiece. If a rigid point is used for connecting the mandrel to the thrust spindle, excessive and uncontrollable loads are imposed on the thrust spindle bearing.

In order to overcome this objection, various flexible couplings or connections have been heretofore suggested and used for connecting the mandrel to the thrust spindle, but the constructions proposed have not been entirely satisfactory. Usually in such flexible couplings, the mandrel transmits its thrust to the end of the thrust spindle with a slight rotary movement. Consequently, an appreciable amount of wear results between the bearing surfaces of the coupling. After a short period of use, the contacting surfaces of such couplings tend to wear thereby resulting in axial play in the coupling and transmitting an additional load to the spindle bearing so that there is not only imposed thereon, the normal thrust load but also this additional shock load which, of course, is unsatisfactory.

Accordingly, it is the primary object of the present invention to provide an improved flexible coupling so as to provide a joint between the mandrel bar and thrust spindle of a seamless tube rolling mill which will permit universal alignment of the mandrel bar to the thrust spindle whereby the above mentioned disadvantages are eliminated.

It is another object of the invention to provide an improved flexible coupling in which the contacting parts or surfaces thereof which are made of a steel which does not spall off or gall when the surfaces thereof are brought into sudden contact under heavy pressure.

It is a further object of this invention to provide an improved flexible coupling which is simple, inexpensive and rugged in its construction, and at the same time, efficient and effective in its use.

Various other objects and advantages of this invention will be more apparent in the course of the following specification and will be particularly pointed out in the appended claims.

In the accompanying drawings there is shown, for the purpose of illustration, an embodiment which our invention may assume in practice.

Figure 1:
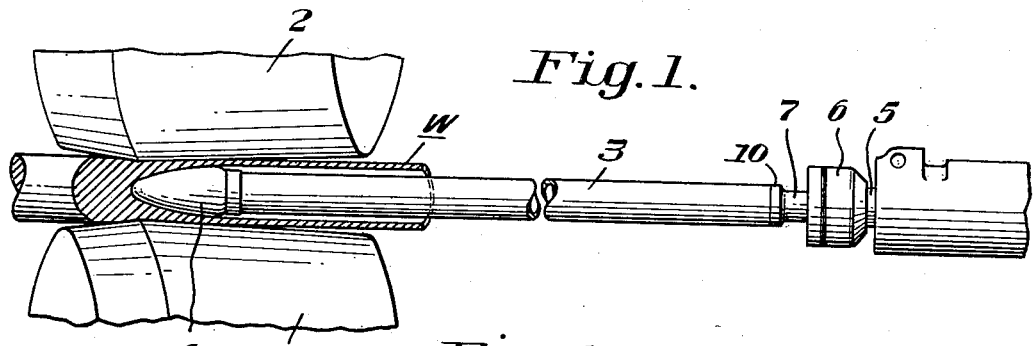
Figure 1 is a side elevational view, of a conventional seamless type of tube mill with the workpiece therein partly in section, showing the improved coupling of our invention incorporated therewith.

Referring more particularly to the drawings, there is shown in Figure 1, a portion of a conventional type seamless tube or pipe rolling mill which comprises a pair of metal working rolls 2 and a workpiece W being acted upon thereby. Between the rolls 2, there is positioned a mandrel bar 3 having a piercing point or plug 4 arranged on the forward or outer end thereof. At the opposite or inner end of the mandrel bar 3, there is positioned a rotatable thrust spindle 5 which is flexibly connected to the mandrel bar by the improved coupling 6 of the present invention.

Figure 2:
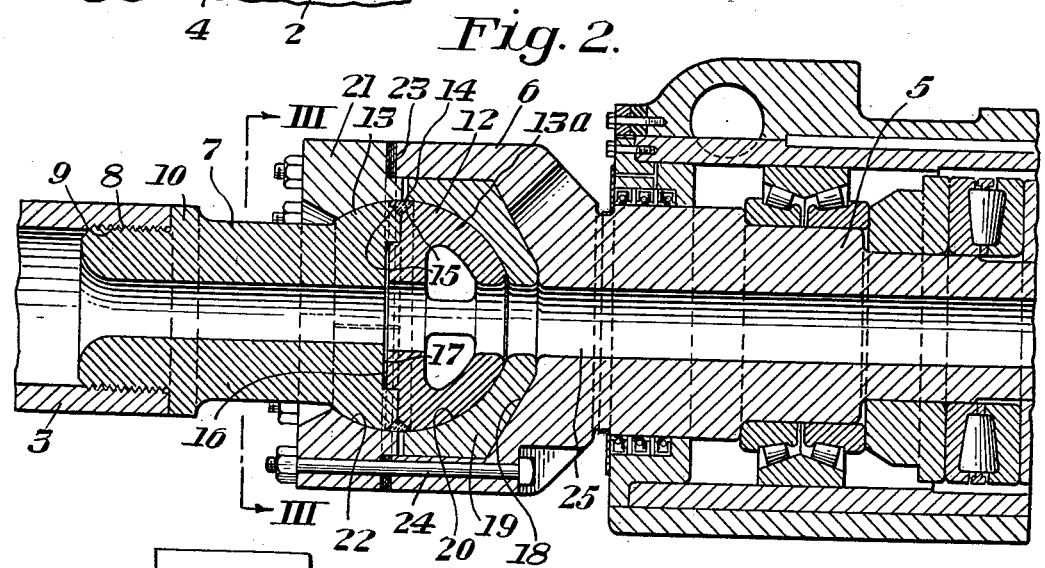
Figure 2 is a longitudinal sectional view through the improved flexible coupling of our invention showing how it is used for connecting the mandrel bar and the thrust spindle of the tube mill, as shown in Figure 1.
Figures 3, 4, 5:
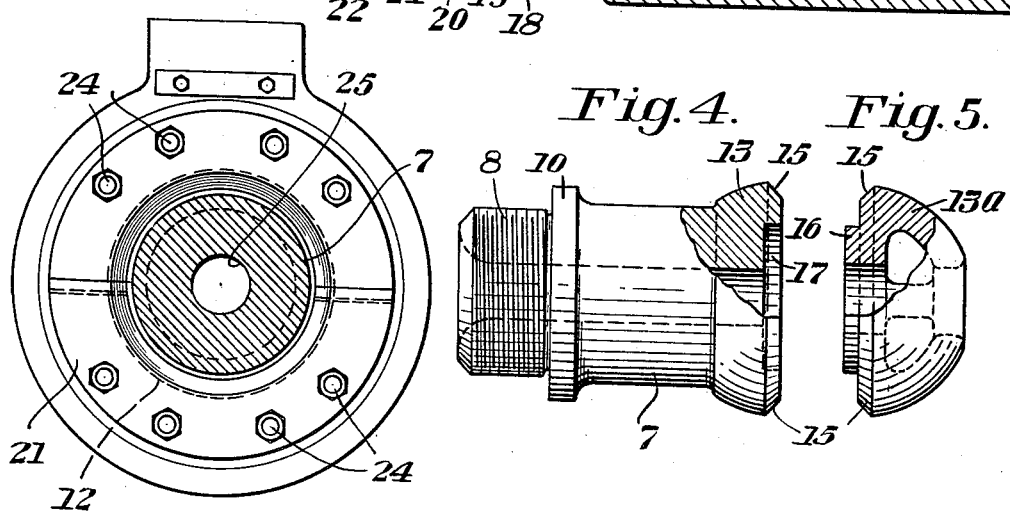
Figure 3 is a section view taken on line III—III of Figure 2.
Figure 4 is a detail view of one part of our improved coupling.
Figure 5 is a detail view of another part thereof.

The improved coupling 6 of our invention, as more clearly shown in Figures 2, 4 and 5 of the drawings, comprises a ball bar head consisting of a longitudinally extending body member 7 having an exteriorly threaded portion 8 arranged on one end thereof which is adapted to cooperate with an interiorly threaded portion 9 on the inner end of the mandrel bar 3 whereby the same is securely attached thereto. There is carried by the body member 7, an annular flange 10 directly next to the threaded portion 8 which is adapted to abut against the end of the mandrel bar when the ball bar head is securely screwed on the end thereof.

On the opposite end of the body member 7, there is arranged a spherical portion 12 which is arranged integrally therewith. The spherical portion 12 consists preferably of an inner semi-spherical portion 13 arranged on the outer end of the body portion 7, and an outer hemi-spherical portion 13a arranged on the extreme outer side of the hemi-spherical portion 13 which is connected thereto preferably by means of a weld 14. The edges of the adjacent sides of both the inner and outer hemi-spherical portions 13 and 13a are preferably beveled, as at 15, so as to provide a space therebetween and therearound when the two hemi-spherical portions are assembled for receiving the welding metal. It will be understood that after the inner and outer hemi-spherical portions are welded together, that the welding metal is cut and machined so as to provide the substantially spherical portion 12 on the end of the body member 7. The outer hemi-spherical portion 13a is made from a relatively hard material and consists preferably of a manganese steel casting. There is arranged on the inner face of the portion 13a, preferably, a cylindrical projecting portion 16 which is adapted to fit into a cylindrical recess 17 arranged in the outer face of the portion 13 so as to provide a tongue and groove joint therebetween in order to insure proper alignment of the two portions when the same are welded together.

There is arranged in the outer end of the thrust spindle 5, preferably, a cylindrical-shaped opening 18 in which there is disposed an insert member 19 having a concave hemi-spherical opening or recess 20 similar in contour to that of the outer hemi-spherical portion 13a of the body member 7. The insert member 19 also consists preferably of a manganese steel casting. On the extreme outer end of the thrust spindle 5, there is positioned preferably an annular cap member 21 which consists preferably of two halves so as to provide a split ring, as shown in Figure 3 of the drawings. The inner periphery of the annular cap member 21 is preferably arcuated or curved as at 22 so as to conform to the contour of the inner hemi-spherical portion 13 of the body member 7 around which it is disposed and with which it cooperates. Between the outer end of the thrust spindle 5 and the cap member 21, there is positioned preferably a plurality of annular shims 23 provided for purposes of adjustment hereinafter to be described. The cap member is securely held on the end of the thrust spindle 5, preferably by means of a plurality of bolts 24.

The mandrel bar 3, the coupling 6, and the thrust spindle 5 are provided preferably with a bore 25 extending therethrough which provides a passageway for the delivery of a cooling fluid through the mandrel bar 3 to the plug or piercing point 4 on the outer end thereof in a manner well known to those skilled in the art.

The improved flexible coupling or connection of our invention is assembled preferably in the following manner. The body member 7 of the coupling 6 is first threaded on the end of the mandrel bar 3. The insert member 19 is then positioned in the recess 18 in the end of the spindle 5. The spherical portion of the body member 7 is then positioned in the concave hemispherical portion 20 of the insert member. The shims 23 are then positioned over the bolts 24 on the end of the thrust spindle 5 and the cap member 21 is then positioned on the end of the thrust spindle and over the insert member 19 so as to be disposed around the inner side of the inner spherical portion 12 of the body member 7. Nuts are then screwed onto the bolts 24 and tightened so that the spherical portion 12 is securely held in position between the insert member 19 and the cap member 21. It will be understood that a sufficient number of shims 23 should be used in order to provide sufficient clearance between the insert member and the cap so that the spherical portion 12 therebetween is free to rotate therein and will not bind. It will be seen that due to the fact that both the inner hemi-spherical portion 13a and the insert member 19 are made of wear-resisting material, such as manganese steel, the contacting surfaces therebetween possess the characteristics of not spalling or galling when heavy pressure is applied suddenly thereto. If the contacting surfaces between the inner spherical portion 13a and the insert member 19 are caused to wear after service, the coupling can be adjusted for such wear by loosening the nuts on the bolts 24 and removing a shim or the required number of shims 23 in order to eliminate any lost motion between the contacting surfaces of the spherical portion and the insert member. After the necessary number of shims have been removed to reassemble the coupling for use, the nuts on the bolts 24 are again tightened.

By providing a coupling of such construction, it will be seen that any lost motion in the coupling can be entirely eliminated, thereby preventing any axial play in the joint thereby eliminating any undue shock and wear on the thrust bearings of the spindle. As a result of our invention, it will be seen that there is provided a flexiblt coupling which can be easily and conveniently maintained, and one which consists of a minimum number of parts, thereby reducing replacement and maintenance costs to a minimum.

While we have shown and described one specific embodiment of our invention, it will be understood that this embodiment is merely for the purpose of illustration and description and that various other forms may be devised within the scope of our invention, as defined in the appended claims.

We claim:

1. In a seamless tube mill having a rotatable compression mandrel bar, a thrust bearing, a thrust spindle rotatably mounted in said thrust bearing and means providing a flexible friction drive from said mandrel to said spindle, said means including a socket member on said spindle and a ball member on said mandrel, said ball and socket members having aligned openings therein in line with the axes of the mandrel and spindle and being characterized by having continuous hemi-spherical bearing surfaces therebetween except for said openings, means fastened to said spindle for detachably holding said bearing surfaces together to prevent lost motion therebetween, and means between said last-named means and spindle for compensating for wearing of said surfaces.

2. In a seamless tube mill having a rotatable compression mandrel bar, a thrust bearing, a thrust spindle rotatably mounted in said thrust bearing and means providing a flexible friction drive from said mandrel to said spindle, said means including a socket member on said spindle and a ball member on said mandrel, said ball and socket members having aligned openings therein in line with the axes of the mandrel and spindle and being characterized by having continuous hemi-spherical bearing surfaces therebetween except for said openings, means fastened to said spindle for detachably holding said bearing surfaces together to prevent lost motion therebetween, and shims between said last-named means and spindle for compensating for wearing of said surfaces.

3. In combination with a rotatable compression bar, a thrust bearing, a thrust spindle rotatably mounted in said thrust bearing and means providing a flexible friction drive from said bar to said spindle, said means including a socket member on said spindle and a ball member on said bar, said ball and socket members having aligned openings therein in line with the axes of the bar and spindle and being characterized by having continuous hemi-spherical bearing surfaces therebetween except for said openings, means fastened to said spindle for detachably holding said bearing surfaces together to prevent lost motion therebetween, and means between said last-named means and spindle for compensating for wearing of said surfaces.

4. In combination with a rotatable compression bar, a thrust bearing, a thrust spindle rotatably mounted in said thrust bearing and means providing a flexible friction drive from said bar to said spindle, said means including a socket member on said spindle and a ball member on said bar, said ball and socket members having aligned openings therein in line with the axes of the bar and spindle and being characterized by having continuous hemi-spherical bearing surfaces therebetween except for said openings, means fastened to said spindle for detachably holding said bearing surfaces together to prevent lost motion therebetween, and shims between said last-named means and spindle for compensating for wearing of said surfaces.

GEORGE J. KIRCHNER.
HARRY OTTINGER.

REFERENCES CITED

The following references are of record in the file of this patent:

UNITED STATES PATENTS

| Number | Name | Date |
|---|---|---|
| 170,058 | Cole | Nov. 16, 1875 |
| 908,414 | Mellin | Dec. 29, 1908 |
| 2,159,123 | Anater | May 23, 1939 |